(12) United States Patent
Justiniano

(10) Patent No.: US 8,596,928 B1
(45) Date of Patent: Dec. 3, 2013

(54) CEMENT-TREATED SOIL BLOCKS WITH VEGETATIVE FACES

(76) Inventor: Henry G Justiniano, Danville, CA (US)

( * ) Notice: Subject to any disclaimer, the term of this patent is extended or adjusted under 35 U.S.C. 154(b) by 290 days.

(21) Appl. No.: 12/966,723

(22) Filed: Dec. 13, 2010

Related U.S. Application Data

(63) Continuation-in-part of application No. 12/152,320, filed on May 12, 2008, now Pat. No. 7,850,402.

(60) Provisional application No. 60/938,593, filed on May 17, 2007, provisional application No. 60/988,779, filed on Nov. 17, 2007.

(51) Int. Cl.
*E02D 5/00* (2006.01)
*A01G 17/06* (2006.01)

(52) U.S. Cl.
USPC ............... 405/286; 405/284; 47/44; 47/47; 47/83

(58) Field of Classification Search
USPC ............ 405/284, 286, 287; 47/1.01 F, 1.01 T, 47/18, 19, 19.1, 29.5, 31.1, 33, 44, 47, 47/65.9, 83
See application file for complete search history.

(56) References Cited

U.S. PATENT DOCUMENTS

| 4,564,316 A | 1/1986 | Hunziker |
| 4,725,216 A | 2/1988 | Foster |
| 5,029,804 A | 7/1991 | McGregor |
| 5,658,096 A | 8/1997 | Von Kanel |
| 6,817,811 B1 * | 11/2004 | Chen .............................. 405/287 |
| 7,048,472 B2 * | 5/2006 | Woolford et al. ............. 405/286 |
| 2003/0143026 A1 | 7/2003 | Santha |
| 2005/0241257 A1 | 11/2005 | Price |

FOREIGN PATENT DOCUMENTS

JP          2000110144 A          4/2000

* cited by examiner

*Primary Examiner* — Benjamin Fiorello
(74) *Attorney, Agent, or Firm* — Mark Lauer; Silicon Edge Law Group LLP

(57) ABSTRACT

A retaining wall or steeply faced slope is disclosed having a naturally green facade. The wall or slope is made of blocks of compacted earth, each having a face reinforced with wire mesh and covered with vegetation such as native grasses. The blocks may be formed onsite, saving transportation costs and other waste, using native soils. The mesh may extend beyond other faces of each block to provide handles and geogrid anchoring. A press is disclosed to form the blocks by compacting soil mixed with cement, the press including hydraulic rams or screw jacks that create immense pressures and having wedge shaped sides that relieve lateral confining pressure when the block is extracted.

13 Claims, 4 Drawing Sheets

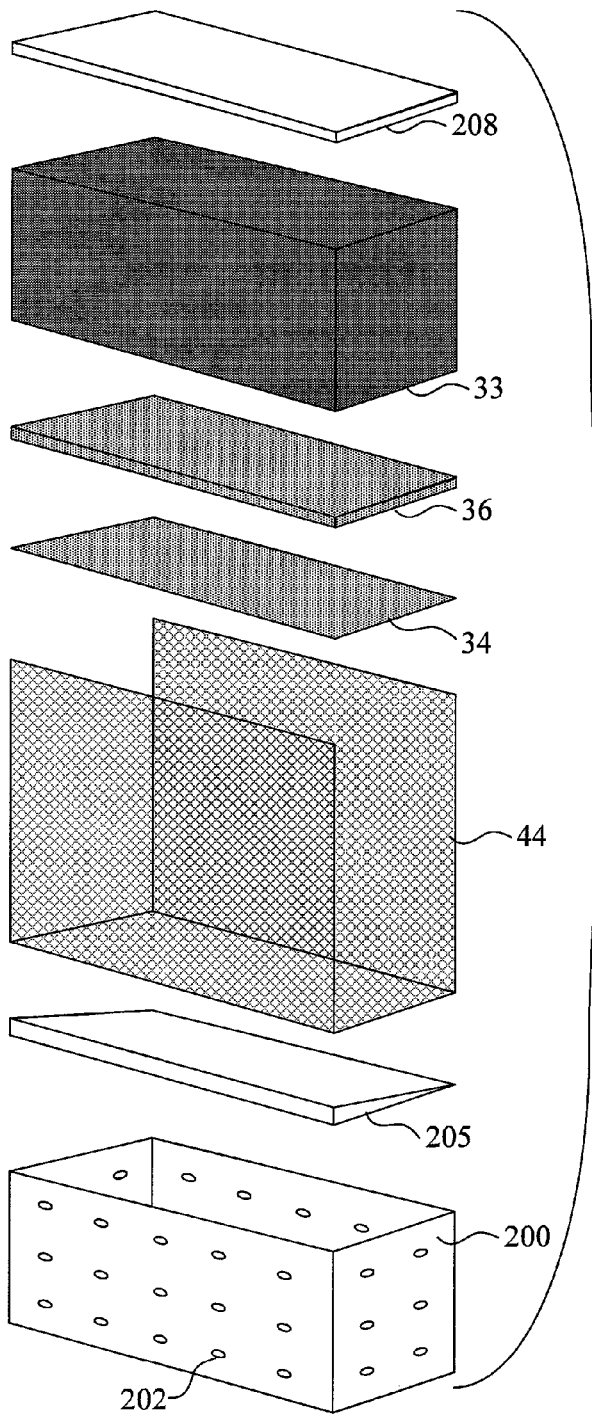
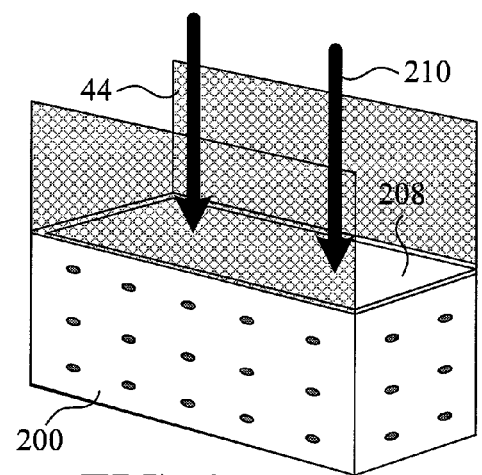
FIG. 3
FIG. 4

CEMENT-TREATED SOIL BLOCKS WITH VEGETATIVE FACES

CROSS-REFERENCE TO RELATED APPLICATIONS

This application is a continuation in part of application Ser. No. 12/152,320, filed May 12, 2008, which is incorporated by reference herein. Application Ser. No. 12/152,320 claims the benefit under 35 U.S.C. §119(e) of Provisional Application Ser. No. 60/938,593, filed May 17, 2007 and Provisional Application Ser. No. 60/988,779, filed Nov. 17, 2007, both of which are incorporated by reference herein.

BACKGROUND

Soil has been used for construction for many hundreds of years. For instance, walls made of rammed earth and mud at Jiayuguan, China are said to have been built during the Ming Dynasty. Modern rammed earth walls are typically formed by first creating forms outlining the desired shape of a section of the wall. Damp soil that may be mixed with cement or other materials is then poured in to a depth of between 10 cm and 25 cm (4 to 10 inches). A pneumatically powered backfill tamper is then used to compact the soil to about one-half its original height. Further layers of soil are added and the process is repeated until the wall has reached the desired height.

Retaining walls for slopes are typically made of masonry, stone, brick, concrete, vinyl, steel or timber. A retaining wall can be made, for example, by pouring concrete into form boards that outline the wall. Also known is to make retaining walls with wide concrete slabs that are stacked on each other to form the wall. Geogrid reinforcement, a metal or plastic mesh that holds rocks or soil in place, can also be used to help secure a slope.

SUMMARY

In one embodiment, a device is disclosed comprising: a block containing a mixture of soil and a binder that has been compacted into a rigid state; a wire mesh that is integrated into a first face of the block; and a covering of plants on the first face, the plants growing from mulch that is integrated into the first face.

In one embodiment, a device is disclosed comprising: a plurality of blocks that are stacked to form a wall, wherein each of the blocks includes: a mixture of soil and cement that has been compacted into a rigid state; a mesh that is integrated into a first face of the block; and a covering of plants on the first face, the plants growing from a mulch that is integrated into the first face; wherein the first faces of the blocks are substantially aligned to provide a revetment.

In one embodiment, a method is disclosed comprising: providing a rigid container having a pair of parallel sides and a bottom that abuts the sides; placing a wire mesh in the container adjacent the bottom; placing a layer of mulch in the container adjacent the bottom; mixing a binder into soil to form a soil mixture; placing the soil mixture in the container; compacting the soil mixture into a rigid block; removing the block from the container; stacking the block along with other blocks to form a wall with the mulch exposed; and growing plants in the mulch.

This brief summary does not purport to define the invention, which is described in detail below and defined by the claims.

BRIEF DESCRIPTION OF THE DRAWINGS

FIG. 3 is an exploded perspective view of elements used to make the block of FIG. 1.

FIG. 4 is a perspective view of the elements of FIG. 3 combined and compacted to form the block of FIG. 1.

DETAILED DESCRIPTION OF THE PREFERRED EMBODIMENT

Figure 1:
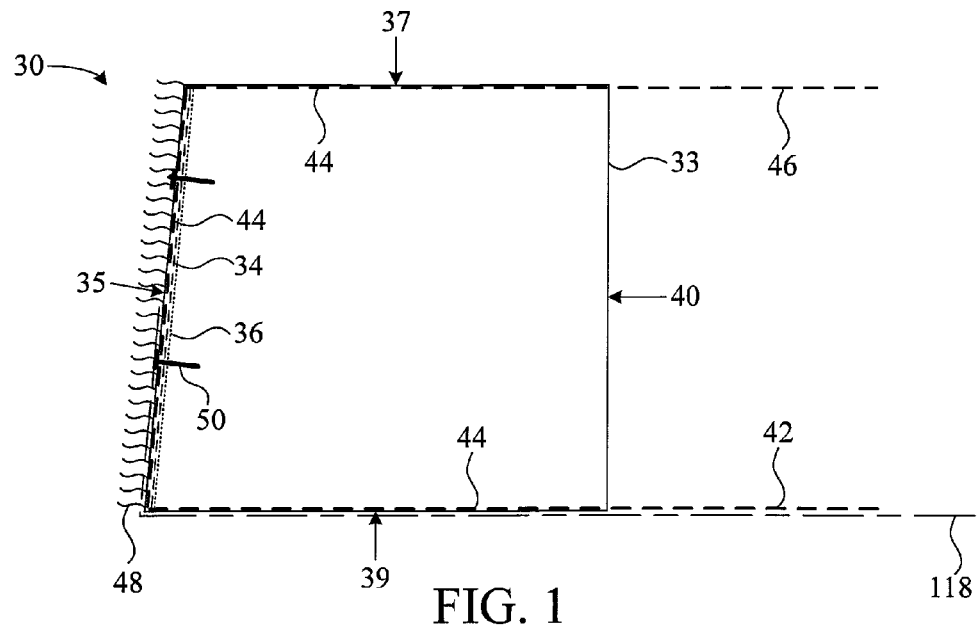
FIG. 1 is a cross-sectional view of a rigidly compacted soil block with a mesh that is integrated into a face of the block and a covering of plants on the face.

FIG. 1 is a cross-sectional view of a device 30 including a rigidly compacted soil block 33 with a first mesh 44 that is integrated into a first face 35 of the block. The soil block 33 contains a mixture of soil and a binder, such as cement and/or lime, along with some water, all of which are mixed together prior to compaction. In one embodiment, Portland Class II cement is mixed into the soil at a volume concentration of about ten percent. The mesh 44 in this embodiment is also integrated into a second face 37 and a third face 39 of the block, and extends beyond the second and third faces in portions 42 and 46, which can be used as handles and for interconnecting the device with similar devices and/or a geogrid reinforcement. A layer of mulch 36 is integrated into the first face 35 and covered by plants 48 growing from the mulch. A second, more finely spaced mesh 34 may also be integrated into the first face 35 to help secure the mulch. The first face 35 is at an oblique angle to the second face 37 and the third face 39, as it is at a slight angle from perpendicular to those faces. When the device 30 is situated with the faces 37 and 39 approximately horizontal, this slight angle of the first face 35 from vertical provides a steep slope for a wall having a facade that includes that face.

Surprisingly, the plants 48 may be grown from seeds that were contained in the mulch 36, despite the mulch and seeds being subjected to high pressure during compaction of the block 33. Alternatively, the plants 48 may already be growing from the mulch 36 during compaction, for example as grass turf. In another embodiment, seeds such as grass seeds may be applied to the first face after compaction, for example as grass seeds sprayed on the first face 35 by hydroseeding.

In one embodiment, the mesh 44 is made of galvanized wire with ¼-inch (approximately 0.63 cm) grid. The mesh 44 may be prepared by forming two approximately ninety degree bends to fit the mesh inside the press-box, lining the first 35, second 37 and third 39 faces. The mesh 44 is preferably disposed within about one centimeter of the surface of the first face 35. The mesh 44 may be held to the compacted soil adjacent the first face 35 by one or more fasteners such as screws and washers 50. The two sides of the mesh 44 may extend between 10 cm and 1 m above the box edges, for handling and connecting the block to a geogrid reinforcement, following the compaction process. The extensions of the mesh 44 may alternatively be bent to adjoin and reinforce the fourth face 40.

To test the soil block, Atterberg limits, maximum dry density determinations, freeze/thaw and wet/dry analysis, unconfined compression testing and direct shear strength testing was performed on a predominantly clay soil, to assess the impacts of lime, lime/cement, lime/fly ash, and Portland Class II cement admixture to the soil. The moisture content and percentages by volume of the various above listed treatment compounds were varied to define a pattern that would promote optimum strength. A detailed analysis of the results indicated that excess moisture hinders compaction which in turn reduces strength. The introduction of lime improved the strength of clayey soils, however, lime is not expected to have significant effects on the more desirable granular soils. Cement content on the order of 10 percent by volume, with a moisture content near optimum and a high degree of compaction, was found to be the key to promoting strength. These conclusions were applied to prepare a lime and cement treated clayey soil which yielded internal friction angles of 52.5 degrees and cohesion of 4760 lbs/sq-ft (23,238 kg/sq-meter), which indicates that the required strength for the block application is notably exceeded.

Figure 2:
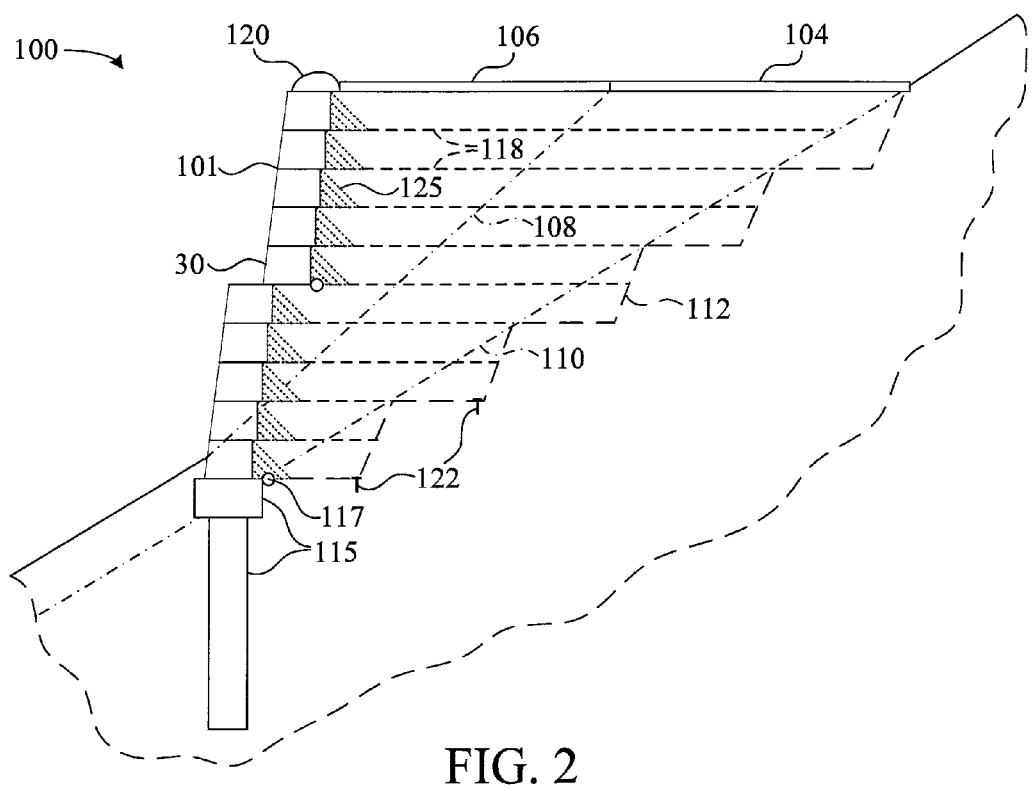
FIG. 2 is a cross-sectional view of a wall made of rigid soil blocks such as the block shown in FIG. 1, with reinforced faces aligned to form a steep vegetative slope.

FIG. 2 shows a cross-sectional view of an engineered landscape 100 including a wall 101 made of stack of rigid soil block devices including device 30. The landscape includes a roadway section 104 like that which existed prior to the creation of wall 101, as well as a new section of roadway 106 that could be formed due to the construction of wall 101. A slope 108 that previously existed beneath roadway 104, and a bedrock stratum 110 that previously existed beneath slope 108, are indicated with dashed lines. As the wall 101 construction progresses, the bedrock 100 may be scored with steps 112. A pier and grade beam foundation 115 for the wall 101 is constructed near the bottom of the steps 112. The slope and bedrock downhill from the foundation 115 and uphill from roadway section 104 need not be modified. A perforated pipe 117 is placed adjacent to the grade beam within a drain rock 125 envelope.

The soil for the blocks in devices 30 can be obtained from the vicinity of engineered landscape 100, saving labor and transportation costs. A preselected layer of material that is available from the hillside where the landscape is located may be excavated and stockpiled. Granular soils are preferred, however, if clayey soils predominate, lime treatment can be introduced during the initial moisture conditioning phase, or select-materials may be imported. The devices 30 are stacked with their angled faces exposed and aligned, and after each block is placed in the wall, drain rock 125 such as gravel is placed against the fourth face 40 and the area between that drain rock and the step is backfilled with native soil and compacted. A geogrid reinforcement mesh 118 is then placed atop the backfilled area and anchored to the mesh of the lower device 30, for example with bolts or ties. The geogrid mesh 118 may also extend beyond the face of the wall to be wrapped upwards and attached to the face 35 of the upper device 30, for example with fasteners 50, as shown in FIG. 1.

The angled faces of the devices 30 are substantially aligned and covered with native grasses to provide a steep, aesthetically pleasing revetment. The grasses are not apparent in this figure due to its scale. The roadway section 104 and 106 are constructed atop the geogrid reinforced backfill, and a berm 120 is provided atop the wall 101 to control drainage.

Thus, the wall 101 is made of solid, unyielding, soil-block units that form an earth-filled slope with a near vertical configuration, while supporting natural vegetative growth at the surface. The blocks that are created by compressing cement-treated-soil that is reinforced by an exterior mantle of galvanized steel wire mesh. In addition, a secondary, small opening mesh is placed between the primary exterior wire mesh revetment and the mulch to protect the thin layer of mulch that is integrated to the exterior face of the block, from migration/erosion and to promote the growth of natural grasses, at the exposed steep slope surface.

The engineered landscape 100 is applicable to slopes that are too steep to receive adequate, in-place compaction efforts on the slope face and be protected from the elements. It is intended to be environmentally friendly, as it eliminates the visual impact that conventional structural retaining walls impose on a landscape. The engineered landscape 100 is significantly different than the well established Geogrid Reinforced Earth-Segmental Block Retaining Wall systems that implement masonry block units, as these are eliminated and replaced by solid-soil-blocks with a reinforced, vegetative revetment. The engineered landscape 100 can be expected to accomplish everlasting stability, provided that the shear strength capacity of the consolidated soil-cement mixture is not exceeded; that provisions are incorporated into the system to protect the integrity of the blocks from moisture infiltration into the solid-soil mass; and resistance to grass fire from the adjacent hillside areas.

FIG. 3 is an exploded perspective view of elements used to make the device 30, which are shown generally in the order they are used, from bottom to top. Initially, a press box 200 is provided that can withstand the pressure that is used to compact the soil mixture and form the soil blocks. The press box 200 is perforated with holes 202 that allow moisture to escape from the soil mixture during compaction, relieving hydrostatic pressure. A wedge shaped insert 205, which may be made of wood, metal, plastic or other suitable material, is placed in a bottom of the press box 200, to produce a desired face batter angle. The first wire mesh 44, which is bent to fit into the press box 200, is then placed atop the insert 205. The second, mulch confining mesh 34 is subsequently placed on the bottom face atop the primary wire mesh 44. The layer of mulch 36 that may contain seeds or, turf is then placed in the press box 200, followed by the soil mixture which will become soil block 33. To make the soil mixture, in one embodiment a volume of moisture conditioned soil that is needed for the creation of a single block is introduced in a soil mixing apparatus and the desired volume of Portland Class II cement is then added.

Following the thorough mixing of the soil and cement, the moisture conditioned soil-cement mixture can then be placed in the press-box, on top of the mulch, and the surface of the mixture may be hand leveled. A press plate 208 is then placed atop the soil mixture 33, so that the combined elements look generally as shown in FIG. 4. Pressure 210 of tens of thousands of pounds per square foot (at least 100,000 kg/sq-meter) is then applied to the press plate 208 to compact the soil mixture. Close monitoring of the consolidation process of the soil mixture can serve to establish the required time of active pressure delivery. Upon completion of a specific time interval of pressure application, the top of the press is pushed off to the side and the block is extracted. The extraction may be achieved by pulling up on the two wire mesh segments 42 and 46 that act as handles, or from the handles 325 of the galvanized sheet metal 323 shown on FIG. 6, that project from the sides of the box, for placement on the outer face of the fill slope. The procedure is continuously repeated to progress upwards with the slope construction.

Figure 5:
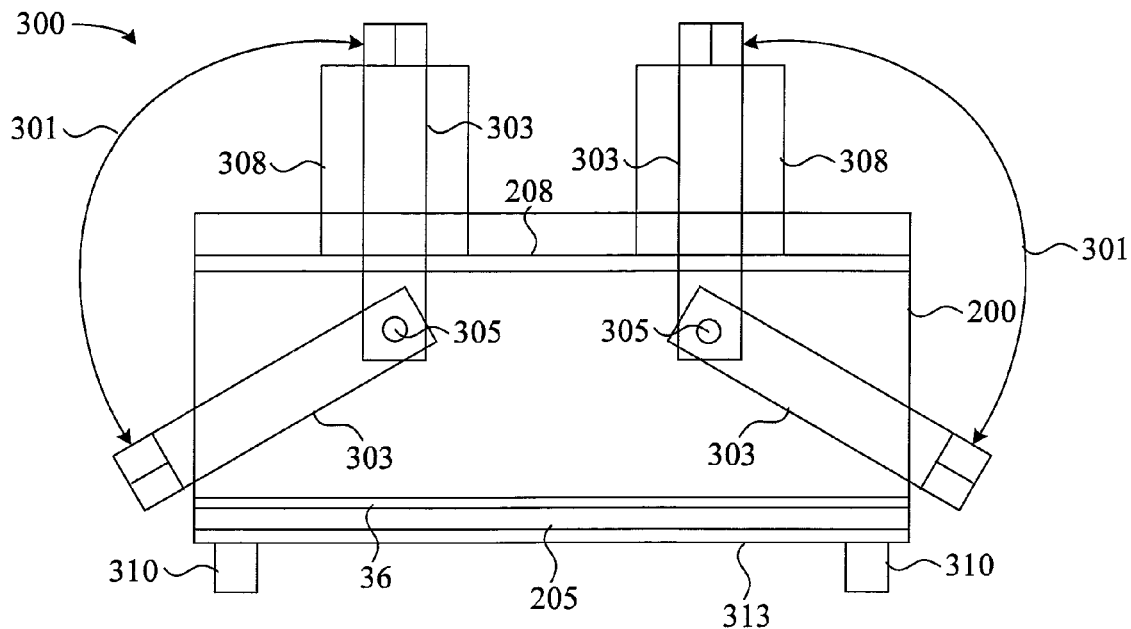
FIG. 5 is a schematic view of a press that can be used to compact binder treated soil to form a rigid earth block such as shown in FIG. 1.

FIG. 5 is a schematic view of a press 300 that can be, used to compact treated soil to form a rigid earth block 33. The particular press 300 that has, been used to test the invention can apply pressure of up to 40,000 lbs/sq-ft (195,280 kg/sq-meter). A pair of arms 303 can rotate about axes 305 as shown by arrows 301 to be positioned lap (vertically) to apply the compression load from a pair of hydraulic rams or screw jacks 308, or rotated down to the sides of press box 202, to allow for the extraction of the compressed block and subsequently replenish the press box with new cement treated soil. The hydraulic rams 308 are constrained by arms 303 to push down on press plate 208 during compaction. Blocks may be provided to extend the distance over which rams 308 can compact the soil mixture. Also shown in this schematic diagram is the wedge shaped insert 205, mulch layer 36, and a bottom plate 313 that can be used to push the compacted soil out of the press box. Four hydraulic rams 310 are provided on the four, lower corners of press box 202 to be used to apply an upward force on bottom plate 313.

Figure 6:
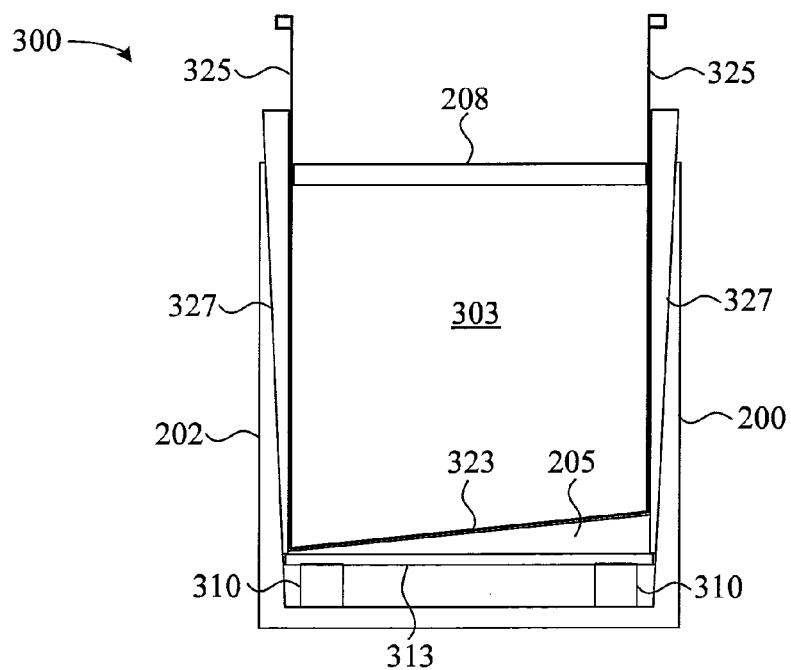
FIG. 6 is a cross-sectional view of a portion of the press of FIG. 5, viewed from a perspective orthogonal to that of FIG. 5.

FIG. 6 is a cross-sectional view of a portion of the press 300, viewed from a perspective orthogonal to that of FIG. 5. An interior of the press box 200 is partially lined with a sheet or band of galvanized metal 323 that has two approximately ninety degree bends, extends beyond press box 200 to provide handles 325 that can be used to extract the compressed block 303 from the press box. A pair of interior side plates 327 are tapered to laterally recede as the plates are pushed upward by the lower hydraulic rams. The press box 200 may also be tapered in regions that adjoin the side plates or, alternatively. An additional tapered but inverted pair of side plates can be provided that adjoin the side plates 327. When hydraulic jacks 310 press upward on bottom plate 313, which in turn pushes upward the side plates 327, the lateral displacement created by the interior movement of the side plates facilitates the extraction of the compressed block.

A gas powered, portable masonry saw can be used to cut the blocks for corner/bends, to conform to the wall alignment and at various intervals where the block layer is interrupted by the need to vary the wall height.

Figure 7:
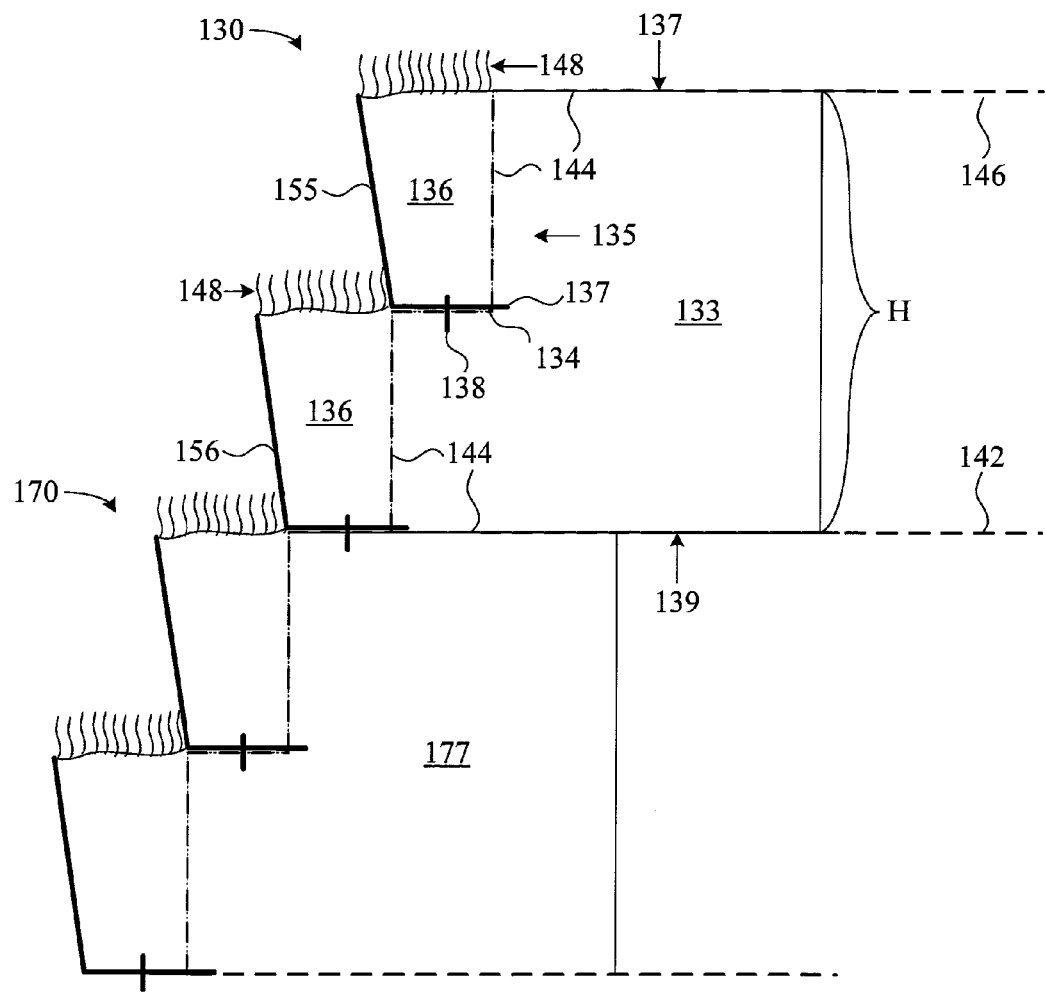
FIG. 7 is a cross-sectional view of a device including a rigidly compacted soil block with a step, and an L-shaped retainer that sits on the step and holds soil for plants.

FIG. 7 is a cross-sectional view of a device 130 including a rigidly compacted soil block 133 with a first mesh 144 that is similar to that described above, but is in the example shown in FIG. 7 bent to from a bench or step 134 in an outward facing portion 135 of the block. To form this bench or step 134 a spacing block (instead of the wedge shaped insert 205 of prior embodiments) can be placed in the press and the mesh bent around the spacing block before the soil mixture is added and compacted. The bench or step 134 may be disposed at about one-half the height H of the block 133. In one example, the spacing block and the resultant bench or step 134 can be about four inches by nine inches, for a soil block having a height H of about eighteen inches, although variations in these ratios as well as in the absolute dimensions of the blocks of up to about fifty percent may be possible. A notch 137 may be formed in the soil block 133, the notch used to fit a L-shaped retainer 155, described below. The notch 137 may be made by having a protrusion on the spacing block, and the mesh 134 may be bent around the protrusion, which may for example measure one inch by one inch by the length of the block. The notch 137 may be considered an inward extension of the bench or step 134.

The soil block 133 contains a mixture of soil and a binder, such as cement and/or lime, along with some water, all of which are mixed together prior to compaction. In one embodiment, Portland Class II cement is mixed into the soil at a volume concentration of about ten percent. The mesh 144 in this embodiment is also integrated into a second face 137 and a third face 139 of the block, and extends beyond the second and third faces in portions 142 and 146, which can be used as handles and for interconnecting the device with similar devices and/or a geogrid reinforcement.

A first generally L-shaped concrete retainer 155 has been separately formed and then placed on the bench or step 134, the retainer then filled with a growing medium 136 such as mulch or topsoil for growing plants 148. Although the weight of the growing medium 136 can hold the retainer 155 to the outward facing portion 135, the bottom of the L-shaped retainer 155 can be fitted into the notch 137, while screws, pins or other fasteners 138 can also be attached to the retainer 155 to hold it to the soil block 133. The L-shaped retainer 155 can be made of material other than concrete, such as a metal or plastic mesh for the side and/or bottom that can retain its L-shape, and the angle between the bottom and side of the retainer can be between about 90° and about 120° to provide expanded surface area for the plants 148. The retainer 155 should have a depth of at least about six inches for adequate root growth.

A second retainer 156 is placed atop a second device 170 that is much like device 130. Devices 130 and 170, and if desired additional such devices, can be stacked to form a retaining wall, including additional features such as described above for such a wall. The plant roots of the second retainer may grow into a compacted soil block 177 that is part of the second device, for the case in which the second retainer 156 has a bottom that is penetrable by plant roots. The retaining wall may have a level to slightly positive slope on the surfaces where plants grow, and a negative slope in the areas defined by the faces of the L-shaped retainers.

Although the present invention has been described in detail, it should be understood that various changes, substitutions, and alterations can be made hereto without departing from the spirit and scope of the invention as defined by the appended claims.

The invention claimed is:

1. A device comprising:
a block containing a mixture of soil and a binder that has been compacted into a rigid state, the block having a first face, a second face and a third face, the first face including an upper portion, a lower portion and a step that is disposed between the upper portion and the lower portion;
a metal mesh that is integrated into the first face of the block and substantially follows the shape of the first face;
a substantially L-shaped retainer having a bottom portion and a side portion, wherein the bottom portion sits on the step and the side portion is separated from the upper portion to form a container that holds a growing medium; and
plants growing from the growing medium.

2. The device of claim 1, further comprising a second block that is substantially the same as the block, the second block disposed beneath the block and offset from the block; and a second substantially L-shaped retainer having a second bottom portion and a second side portion, wherein the second bottom portion sits on the offset and the second side portion is separated from the lower portion to form a cavity that holds additional growing medium, with additional plants growing from the additional growing medium.

3. The device of claim 1, wherein the substantially L-shaped retainer has an angle between its bottom portion and its side portion that is greater than ninety degrees and less than about one hundred twenty degrees.

4. The device of claim 1, wherein the block has a height measured along the first face, and the step is disposed at about one-half the height.

5. The device of claim 1, wherein the second and third face of the block each abut the first face and are substantially parallel to each other.

6. The device of claim 5, wherein the mesh extends beyond the second and third faces to provide handles for the block.

7. The device of claim 1, wherein the substantially L-shaped retainer fits in a notch in the block.

8. The device of claim 1, wherein a fastener holds the substantially L-shaped retainer to the block.

9. A device comprising:
    a plurality of blocks that are stacked to form a wall, wherein the wall includes:
    a mixture of soil and cement that has been compacted into a rigid state to form the blocks, and a metal mesh that is integrated into a first face of each of the blocks; and
    a plurality of substantially L-shaped retainers each having a bottom portion and a side portion;
    wherein the first faces of the blocks are offset from each other to provide a series of steps, with one of the substantially L-shaped retainers disposed on each of the steps, such that the side portion of each substantially L-shaped retainer is separated from one of the first faces to form a series of containers; and
    a growing medium is disposed in each of the containers.

10. The device of claim 9, wherein the first face of each of the blocks has an upper portion, a lower portion and a substantially horizontal portion disposed between the upper and lower portions, with the substantially horizontal portion supporting one of the substantially L-shaped retainers whose side portion is spaced apart from the upper portion to form a cavity that contains a growing medium.

11. The device of claim 10, wherein the mesh is the upper portion, the lower portion and the substantially horizontal portion.

12. The device of claim 9, wherein each of the blocks further comprises metal mesh that is integrated into second and third faces of the block.

13. The device of claim 9, wherein each of the blocks has second and third faces that are parallel to each other.

* * * * *